Oct. 18, 1960    B. HALL    2,956,361
DEVICE FOR INDENTIFYING ANIMALS
Filed Jan. 28, 1959

INVENTOR
Baird Hall
BY
Ernest A. Joerren
ATTORNEY

United States Patent Office 2,956,361
Patented Oct. 18, 1960

2,956,361

DEVICE FOR IDENTIFYING ANIMALS

Baird Hall, Hyde Park, Vt., assignor to C. H. Dana Co., Inc., Hyde Park, Vt., a corporation of New Hampshire Filed Jan. 28, 1959, Ser. No. 789,560

1 Claim. (Cl. 40—300)

The present invention relates to checks, labels and tags, and, more particularly, to an improved device for displaying an animal marker for show cattle and the like.

One form of animal marker which is popular and is used widely comprises a plastic check having identifying indicia on both sides thereof, such as numerals, and having a large aperture at the upper end thereof for receiving a chain or rope providing a loop adapted to be hung about the neck of the animal.

One of the difficulties with such markers was that they would dangle on the rope or chain and would assume haphazard positions whereby the indicia on only one side could be seen. Since show cattle are examined by several judges who stand in different positions such as in front and to both sides of the animal, it often happens that not all the judges can see the indicia from where they are standing and must move about to see the indicia. Any attempt to adjust the marker is futile because any movement of the animal again disrupts the marker.

Another difficulty is that a chain requires fastening means which increases the cost thereof. While a rope is not subject to such disadvantage, the use of ropes is generally avoided because they must be knotted to provide a loop, and knots, even if neatly made, present an unsightly and displeasing appearance on an animal in the show ring.

Accordingly, an object of the present invention is to provide an improved device for identifying animals which is not subject to the foregoing difficulties.

Another object is to provide such a device which maintains the marker in a position whereby the indicia can be seen from both sides of the animal.

Another object is to provide such a device which enables a rope to be secured to a marker in a manner which presents a pleasing appearance.

A further object is to provide a device which accomplishes the foregoing in a simple, practical and economical manner.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the present invention, the foregoing objects are accomplished by the provision of a device for identifying animals which comprises a marker having indicia on both sides thereof and having aperture means extending therethrough, and a length of bendable shape sustaining material providing a loop adapted to be hung about the neck of the animal, the length extending through the aperture means and cooperating therewith to maintain the marker in a plane passing through the middle of the loop and perpendicular to the plane in which the loop is disposed, whereby the indicia can be clearly seen from both sides of the animal.

A preferred embodiment of the invention has been chosen for purposes of illustration and description, and is shown in the accompanying drawing, forming a part of the specification, wherein.

Figure 1:
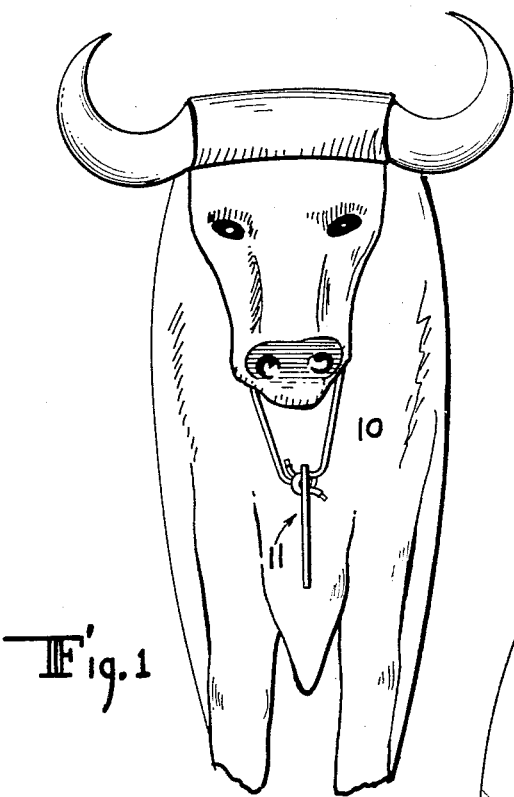
Fig. 1 is a front view of an animal such as a bull having a device in accordance with the present invention hung about its neck with the marker held in its desired position.
Figure 2:
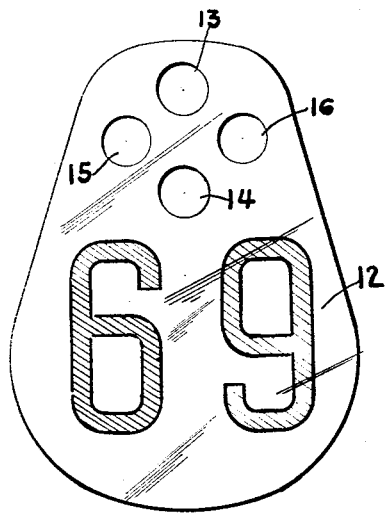
Fig. 2 is a plan view of one side of the marker without the loop.

Referring to the drawing in detail, there is shown an animal having a device in accordance with the invention hung about its neck which device generally comprises a length 10 of material providing the loop and a marker 11.

The material of which the length 10 is formed preferably is such that the length is bendable and that its shape can be sustained. By bendable shape sustaining material is meant a rope or heavy cord of threads or strands or a filament or tube of plastic material. Preferably, the length of material providing the loop is braided nylon rope which is very attractive in appearance and has the desired characteristics required to carry out the invention as will be described hereinafter.

The marker 11 has a conventional shape and is formed of plastic having a thickness of about one-eighth inch. Both sides of the marker have indicia 12 thereon such as a numeral for identifying the animal by its program number.

A preferred manner of attaching the rope to the marker comprises providing the marker with two pairs of adjacent holes near its upper end, such as an upper hole 13, a lower hole 14 and side holes 15 and 16 arranged in a square or diamond, and lacing the respective ends of the rope into two of the holes.

Figure 3:
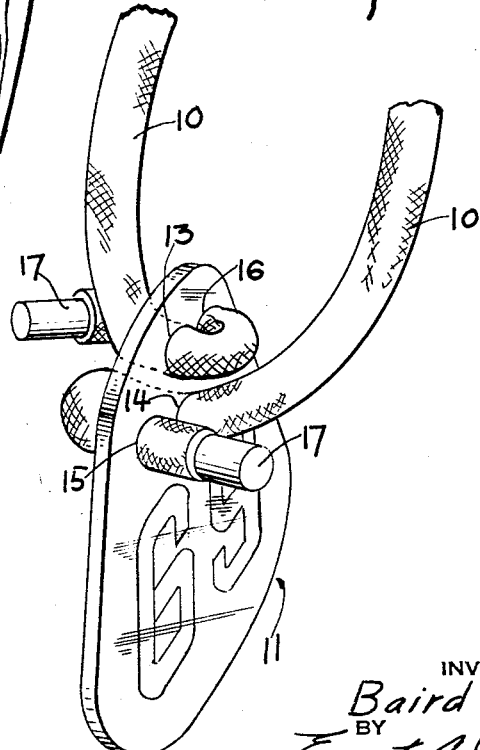
Fig. 3 is a perspective view illustrating a preferred manner of securing the loop to the marker.

It has been found that the marker can be maintained in a plane passing through the middle of the loop and perpendicular to the plane in which the loop is disposed (Fig. 1) by having one end of the rope first enter the upper hole 13 from one side of the marker and then pass through the side hole 15 and having the other end of the rope first enter the lower hole 14 from the other side of the marker and then pass through side hole 16 (Fig. 3). When the rope is laced into the aperture means so arranged, its shape sustaining characteristic or semi-rigidity positions the marker with respect to the loop.

Preferably, the rope has a slightly greater diameter than the holes, which have a diameter of about one-quarter inch, to enable the rope to be compressed when inserted into the holes and thereby somewhat increase the rigidity of the rope adjacent the holes. Entry of the ends of the rope into the holes is facilitated by providing the ends with tips 17 having a slightly smaller diameter than the holes (Fig. 3).

From the foregoing description it will be seen that the present invention provides a device for identifying animals which facilitates the use of rope and its attachment to the marker and positions the marker so that the indicia thereon can be seen from both sides of the animal. The device is weatherproof and durable, is attractive in appearance and is economical to manufacture.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

A device for identifying animals comprising a marker having indicia on both sides thereof and provided with aperture means including two pairs of adjacent apertures extending therethrough at the upper end thereof and including an upper, a lower and two side apertures arranged in a square, and a length of rope providing a loop adapted to be hung about the neck of the animal, said loop having one end laced through the upper aperture and one side aperture and having its other end laced through the lower aperture and the other side aperture and cooperating therewith to secure said rope to said marker the ends of said rope first entering said upper and lower apertures respectively from opposite sides of said marker.

References Cited in the file of this patent

UNITED STATES PATENTS

| | | |
|---|---|---|
| 171,894 | Wheeler | Jan. 4, 1876 |
| 1,503,410 | Yates | July 29, 1924 |
| 1,806,162 | Hahn | May 19, 1931 |
| 1,871,064 | Kipper | Aug. 9, 1936 |
| 2,640,288 | Orlin | June 2, 1953 |
| 2,805,499 | Muller | Sept. 10, 1957 |